US011847225B2

(12) United States Patent
Kim et al.

(10) Patent No.: US 11,847,225 B2
(45) Date of Patent: Dec. 19, 2023

(54) BLOCKING ACCESS TO FIRMWARE BY UNITS OF SYSTEM ON CHIP

(71) Applicant: SAMSUNG ELECTRONICS CO., LTD., Suwon-si (KR)

(72) Inventors: Siheung Kim, Suwon-si (KR); Keunyoung Park, Seongnam-si (KR); Dongjin Park, Seoul (KR)

(73) Assignee: Samsung Electronics Co., Ltd.

( * ) Notice: Subject to any disclaimer, the term of this patent is extended or adjusted under 35 U.S.C. 154(b) by 404 days.

(21) Appl. No.: 17/077,817

(22) Filed: Oct. 22, 2020

(65) Prior Publication Data
US 2021/0279334 A1    Sep. 9, 2021

(30) Foreign Application Priority Data
Mar. 6, 2020  (KR) .......................... 10-2020-0028586

(51) Int. Cl.
| | |
|---|---|
| *G06F 21/54* | (2013.01) |
| *G06F 21/64* | (2013.01) |
| *G06F 15/78* | (2006.01) |
| *G06F 9/455* | (2018.01) |
| *G06F 12/14* | (2006.01) |
| *G06F 21/57* | (2013.01) |

(52) U.S. Cl.
CPC ........ *G06F 21/572* (2013.01); *G06F 9/45533* (2013.01); *G06F 12/1441* (2013.01); *G06F 15/7807* (2013.01); *G06F 21/54* (2013.01); *G06F 21/64* (2013.01); *G06F 2009/45583* (2013.01); *G06F 2212/7201* (2013.01)

(58) Field of Classification Search
CPC ...... G06F 21/54; G06F 21/572; G06F 21/604; G06F 21/64; G06F 2212/1052; G06F 2212/152; G06F 2212/7201; G06F 12/0638; G06F 12/1441; G06F 12/1491; G06F 15/7807; G06F 15/7864; G06F 2009/45583; G06F 9/3004; G06F 9/35; G06F 9/4406; G06F 9/44589; G06F 9/45533; G06F 9/45558
See application file for complete search history.

(56) References Cited

U.S. PATENT DOCUMENTS

| | | |
|---|---|---|
| 7,103,529 B2 | 9/2006 | Zimmer |
| 8,554,686 B2 | 10/2013 | Paul et al. |
| 9,213,826 B2 | 12/2015 | Gu et al. |
| 9,589,138 B2 | 3/2017 | Yao et al. |
| 10,063,380 B2 | 8/2018 | Brandwine et al. |

(Continued)

FOREIGN PATENT DOCUMENTS

| | | |
|---|---|---|
| KR | 10-1064164 B1 | 9/2011 |
| KR | 10-2012-0014673 A | 2/2012 |

*Primary Examiner* — Theodore C Parsons
(74) *Attorney, Agent, or Firm* — Fish & Richardson P.C.

(57) ABSTRACT

A system on chip includes a memory, a main processor that runs an operating system, and first Intellectual Properties (IPs) that perform respective processing operations. The main processor operates to copy target firmware to the memory using a firmware loader, using a hypervisor, block access of the main processor and the first IPs to the target firmware before verification of the target firmware, and using the hypervisor, grant access to the target firmware by a target IP among the first IPs that corresponds to the target firmware after the verification of the target firmware.

18 Claims, 15 Drawing Sheets

(56) References Cited

U.S. PATENT DOCUMENTS

| | | | |
|---|---|---|---|
| 10,079,841 B2 | 9/2018 | Gupta et al. | |
| 10,110,624 B2 | 10/2018 | Zapletal et al. | |
| 10,140,130 B2 | 11/2018 | Wesie et al. | |
| 10,261,779 B2 | 4/2019 | Yuan | |
| 2006/0294355 A1 | 12/2006 | Zimmer et al. | |
| 2009/0178033 A1* | 7/2009 | Challener | G06F 9/4411 |
| | | | 726/2 |
| 2012/0254865 A1 | 10/2012 | Saeki et al. | |
| 2013/0124840 A1* | 5/2013 | Diluoffo | G06F 21/575 |
| | | | 713/2 |
| 2014/0250290 A1 | 9/2014 | Stahl et al. | |
| 2017/0215074 A1 | 7/2017 | Choi et al. | |
| 2017/0255775 A1 | 9/2017 | Sorresso | |
| 2017/0322790 A1* | 11/2017 | Surdu | H04L 63/123 |
| 2018/0268146 A1 | 9/2018 | Suryanarayana et al. | |
| 2018/0330095 A1* | 11/2018 | Packer Ali | H04L 9/3247 |
| 2019/0044733 A1 | 2/2019 | Bonzini et al. | |
| 2019/0250900 A1* | 8/2019 | Troia | G06F 8/65 |
| 2019/0332425 A1* | 10/2019 | Narayana | G06F 9/3851 |

\* cited by examiner

BLOCKING ACCESS TO FIRMWARE BY UNITS OF SYSTEM ON CHIP

CROSS-REFERENCE TO RELATED APPLICATION

This application claims priority from Korean Patent Application No. 10-2020-0028586, filed on Mar. 6, 2020, in the Korean Intellectual Property Office, the disclosure of which is incorporated by reference herein in its entirety.

BACKGROUND

1. Field

The present disclosure relates to a system on chip, and more particularly, to a system on chip for safely loading firmware and a method of operating the same.

2. Description of Related Art

As mobile technology develops and various functions are required, functions to be processed by a system on chip are increasing, and accordingly, in order to improve the performance of mobile devices and perform optimized functions, in addition to the main processor, Intellectual Property (IP) such as a digital signal processor (DSP) with various functions is under development. For example, recent system on chips (SoCs) have been equipped with a Neural Processing Unit (NPU) and Tensor Processing Unit (TPU) optimized for artificial intelligence-related parallel computing, and may replace the main processor, and even camera functions that require complex calculations are distributing calculations to DSPs to speed up processing.

Moreover, the DSP may perform operations similar to the main processor including a plurality of cores. That is, the DSP may read software code in a memory to perform a predetermined operation, and while performing the operation, may access the memory from time to time to read algorithms or software data or to write calculation results.

In addition, DSPs are increasingly used in a secure area (e.g., a Trusted Execution Environment (TEE) area) for secure data processing. For example, an artificial intelligence processing operation requiring face recognition or other secure processing may be performed in the DSP instead of the main processor. In order to control the DSP in a secure area, the firmware, algorithms, and data that control the DSP must all operate on protected memory, and the verification of firmware and the like should also be performed first. However, data is copied to the memory area corresponding to the secure area during the verification operation for the firmware and the like, and when the DSP performs verification using the copied data, there is a problem in that data movement occurs multiple times, and accordingly, calculation time increases.

SUMMARY

It is an aspect to provide a system on chip for efficiently moving and protecting data and a method of operating the same when a predetermined IP instead of the main processor in the secure area performs a predetermined data processing operation, or when the main processor directly performs a predetermined data processing operation.

According to an aspect of one or more exemplary embodiments, there is provided an operating method of a system on chip having a main processor and a plurality of first Intellectual Properties (IPs), the operating method comprising copying, by the main processor using a firmware loader, first target firmware to a memory; blocking, by the main processor using a hypervisor, access to the first target firmware by the main processor and the plurality of first IPs; verifying, by the main processor using a firmware verifier, the first target firmware; and granting, by the main processor using the hypervisor, access to the first target firmware by a target IP among the plurality of first IPs based on the verification result.

According to another aspect of one or more exemplary embodiments, there is provided a System on Chip (SoC) comprising a memory; a main processor configured to run an operating system; and a plurality of first Intellectual Properties (IPs) configured to perform a respective processing operation, wherein the main processor is configured to copy target firmware to the memory using a firmware loader, using a hypervisor, block access of the main processor and the plurality of first IPs to the target firmware before verification of the target firmware, and using the hypervisor, grant access to the target firmware by a target IP among the plurality of first IPs that corresponds to the target firmware after the verification of the target firmware.

According to another aspect of one or more exemplary embodiments, there is provided an operating method of a system on chip having a main processor, a plurality of Intellectual Properties (IPs), and a security system, the method comprising requesting, by a kernel executed by the main processor to a hypervisor executed by the main processor, management for loading target firmware; changing, by the hypervisor, access permission for at least one of the main processor and the plurality of IPs to a memory area to which the target firmware is to be loaded; loading, by the kernel, the target firmware into the memory area; requesting, by the kernel to the hypervisor, verification of the target firmware that is loaded; changing, by the hypervisor, access permission for at least one of the main processor and the plurality of IPs to the memory area; requesting, by the hypervisor to the security system, verification of the target firmware that is loaded; performing, by the security system, verification on the target firmware that is loaded; providing, by the security system to the hypervisor, a verification result of the verification; changing, by the hypervisor based on the verification result, access permission for at least one of the main processor and the plurality of IPs to the memory area; and executing, by the kernel, the target firmware that is loaded.

BRIEF DESCRIPTION OF THE DRAWINGS

Various embodiments will be more clearly understood from the following detailed description taken in conjunction with the accompanying drawings, in which.

DETAILED DESCRIPTION

Hereinafter, various exemplary embodiments will be described in detail with reference to the accompanying drawings.

Figure 1:
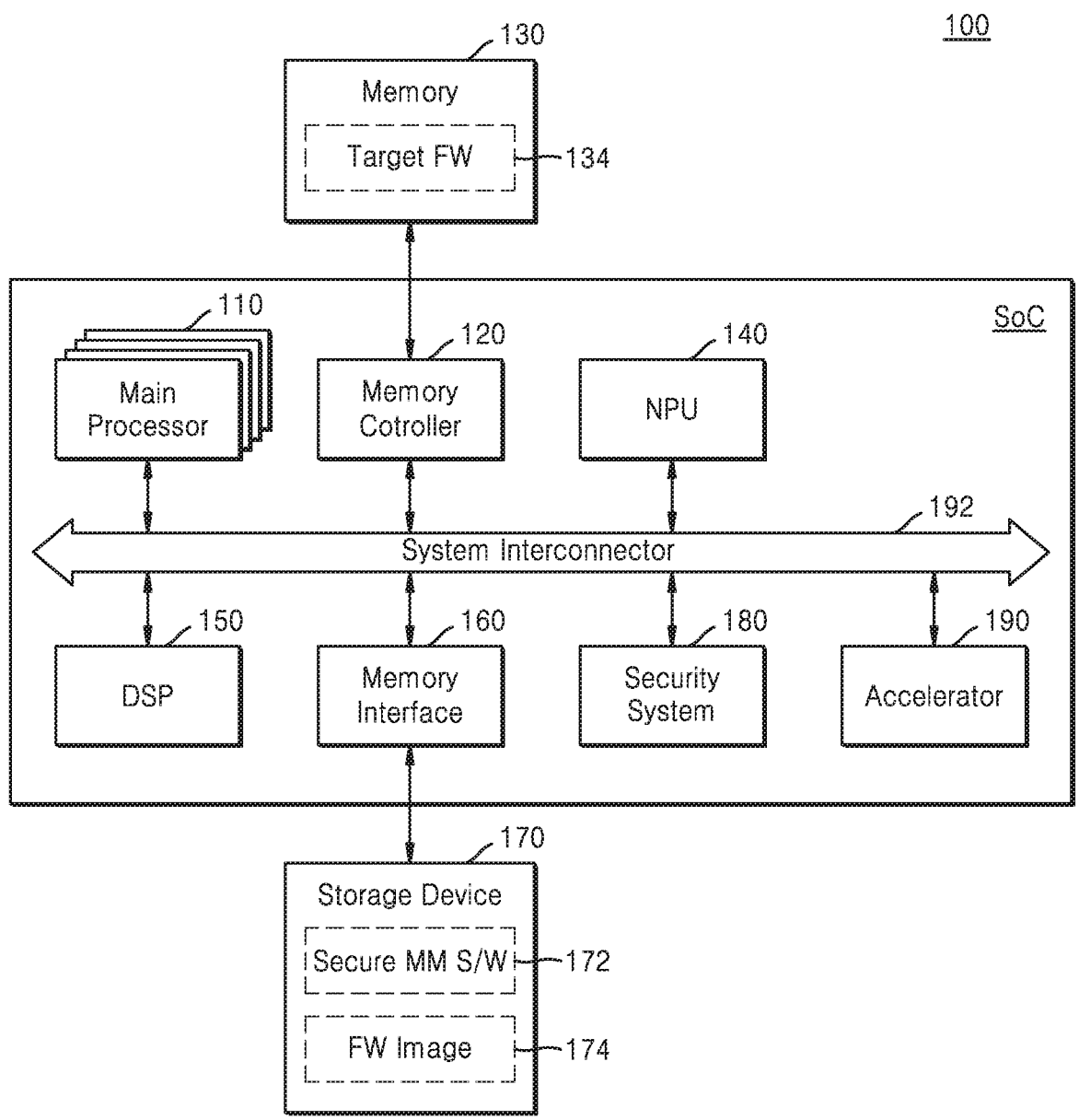
FIG. 1 is a block diagram schematically illustrating a mobile device according to an exemplary embodiment.

FIG. 1 is a block diagram schematically illustrating a mobile device according to an exemplary embodiment. It will be fully understood that the configuration and operation of a mobile device 100 illustrated in FIG. 1 and described below may be applied to other electronic devices.

Referring to FIG. 1, the mobile device 100 may include a system on chip (SoC), a memory (e.g., a working memory) 130, and a storage device 170. Although not illustrated in FIG. 1, the mobile device 100 may further include a liquid crystal display, a touch panel, and a sound device. The SoC may include a main processor (e.g., processor multi-core processor) 110, a memory controller 120, a neural processing unit (NPU) 140, a digital signal processor (DSP) 150, a memory interface 160, a security system 180, and an accelerator 190. In some embodiments, the main processor may be a multi-core processor. Hereinafter, the main processor 110, the NPU 140, and the DSP 150 may each be referred to as an Intellectual Property (IP), and although not shown in the SoC of FIG. 1, IPs (e.g., an image signal processor (ISP), a tensor processing unit (TPU), and the like) that perform data processing to provide various services to a user may be further included. As used in this specification, the term "intellectual property" refers to an intellectual property core, IP core, or IP block that is a reusable unit of logic, cell or integrated circuit (i.e., a chip) layout design that is the intellectual property of one party. Various IP cores or IP blocks are used to build an integrated semiconductor device.

The main processor 110 may control the overall operation of the mobile device 100. At this time, the main processor 110 may perform an operation as one of a normal world and a secure world.

The secure world may mean a secure data processing architecture, and the normal world may mean a general data processing architecture that is not secure. As an exemplary embodiment, the main processor 110 may operate based on the "ARM Trustzone Architecture". This architecture may include two runtime environments, and one of them, an non-secure runtime environment (e.g., a Rich Execution Environment (REE)), may be referred to as a normal zone or a normal world, and may be controlled by a normal operating system. Another runtime environment, a secure runtime environment (e.g., a Trusted Execution Environment (TEE)), may be referred to as a Trustzone or TrustedWorld or Secure World, and the secure runtime environment may be controlled by a secure operating system.

The normal operating system may be, for example, a typical operating system such as Android, Windows phone, iPhone OS (iOS), and the like, and the secure operating system may be an operating system in which a security kernel in which security functions are integrated is embedded in an existing operating system. According to the above-mentioned ARM trust zone, the above-described non-secure runtime environment and secure runtime environment may be together defined as a virtual execution environment.

The main processor 110 may execute software (e.g., application programs, operating systems, device drivers, and the like) to be run on the mobile device 100. The main processor 110 may execute an operating system loaded in the memory 130. The main processor 110 may execute various application programs to be run based on the operating system.

Hereinafter, a case in which the DSP 150 instead of the main processor 110 should operate based on firmware in the TEE will be described. As an exemplary embodiment, the firmware is to be executed in the secure world and may include, for example, a program for performing face recognition, fingerprint recognition, iris recognition, an AI processing operation requiring security, a mobile transaction operation, and the like. Moreover, it will be clear to one of ordinary skill in the art that the technical principles of the present disclosure may be applied to cases in which other IPs such as the NPU 140 and/or the accelerator 190 other than the DSP 150 need to be executed based on the firmware instead of the main processor 110.

As an exemplary embodiment, the main processor 110 may execute secure memory management software (Secure MM S/W) 172 stored in the storage device 170, copy a firmware (FW) image 174 stored in the storage device 170 to the memory 130 to allow the DSP 150 to stably execute the firmware (i.e., the copy of the firmware (FW) image 174) loaded in the memory 130 in the TEE, and perform verification on the firmware (i.e., the copy of the firmware (FW) image 174 loaded in the memory 130) using the security system 180. The firmware (FW) image 174 stored in the storage device 170 may be firmware of various IPs such as the main processor 110, the NPU 140, the DSP 150, the security system 180, and/or the accelerator 190.

Specifically, the main processor 110 may copy the firmware image 174 from the storage device 170 to the memory 130 through a firmware loader in the kernel of the operating system. Hereinafter, the copy of the firmware (FW) image 174 that has been loaded in the memory 130 will be referred to as target firmware (FW) 134.

The main processor 110 may control access to the target firmware 134 using a hypervisor.

A hypervisor is a logical platform for running multiple operating systems simultaneously and may be referred to as a virtual machine monitor or virtual machine manager. Depending on the type, the hypervisor may be executed directly on the main processor 110 or may be executed through the host operating system of the main processor 110. Even if a hacker attack occurs before verification of the target firmware 134, the hypervisor may block non-secure access to the target firmware 134 of IPs to prevent modification or damage to the target firmware 134. In an exemplary embodiment, the hypervisor may adjust read or write permission for an area of the memory 130 in which the target firmware 134 is stored in order to block non-secure access to the firmware of the IPs. The kernel and hypervisor of the main processor 110 may operate in an REE.

The main processor 110 may verify the target firmware 134 using a firmware verifier. The firmware verifier may operate in the TEE and verify the integrity of the target firmware 134. In an exemplary embodiment, the firmware verifier may control the security system 180 to verify the integrity of the target firmware 134. The security system 180 may include a secure IP capable of handling integrity verification operations, and the secure IP may generate a digital signature for the target firmware 134 by applying various types of encryption algorithms, and decrypt the digital signature using a public key. The secure IP may verify the integrity of the target firmware 134 by checking whether the target firmware 134 has been changed using a digital signature and a public key.

When the integrity verification of the target firmware 134 is complete and the integrity of the target firmware 134 passes verification, the main processor 110 may allow the DSP 150 access to the target firmware 134 so that the DSP 150 may execute the target firmware 134 in the TEE. In an exemplary embodiment, the hypervisor may adjust read or write permission for an area in which the target firmware 134 of the memory 130 is stored in order to allow the DSP 150 to access the target firmware 134. As a result, the DSP 150 may execute the target firmware 134 instead of the main processor 110 to perform operations based on the target firmware 134. In some embodiments, the target firmware 134 may be firmware of the main processor 110, and the hypervisor may control access of the main processor 110 the target firmware 134, and the main processor 110 may execute the target firmware 134 to perform an operation based on the target firmware 134.

The memory controller 120 may provide an interface between the memory 130 and the SoC. The memory controller 120 may access the memory 130 in response to the request of the main processor 110 or another IP (e.g., the NPU 140, the DSP 150, the security system 180, and/or the accelerator 190). For example, in response to the write request of the main processor 110, the memory controller 120 may write data to the memory 130, and in response to the read request of the main processor 110, the memory controller 120 ma read data from the memory 130 and transfer the read data to the main processor 110 or the memory interface 160 through a system interconnector 192.

The operating system or application programs may be loaded into the memory 130 when the mobile device 100 is booted. Various input/output operations of the mobile device 100 may be supported by the operating system. Also, a plurality of pieces of firmware (or application programs) may be loaded into the memory 130 to be selected by the user or to provide basic services. In addition to these uses, the memory 130 may be used as a buffer memory for storing image data provided from an image sensor such as a camera. The memory 130 may be a volatile memory such as static random access memory (SRAM), dynamic random access memory (DRAM), and the like or may be a nonvolatile memory such as phase RAM (PRAM), magnetic RAM (MRAM), resistive RAM (ReRAM), ferroelectrics RAM (FRAM), a flash memory, and the like.

The memory interface 160 may access the storage device 170 at the request of the main processor 110 or another IP (e.g., the NPU 140, the DSP 150, the security system 180, and the accelerator 190). That is, the memory interface 160 may provide an interface between the SoC and the storage device 170. For example, data processed by the main processor 110 may be stored in the storage device 170 through the memory interface 160, and data stored in the storage device 170 may be provided to the main processor 110 through the memory interface 160.

The storage device 170 may be provided as a storage medium of the mobile device 100. The storage device 170 may store the security memory management software (secure MM S/W) 172 and the firmware (FW) image 174, and moreover, the storage device 170 may further store a plurality of application programs, an operating system image, and various data. The storage device 170 may be provided as a memory card (e.g., a Multi-Media Card (MMC), an Embedded MMC (eMMC) memory card, a Secure Digital (SD) memory card, a Micro SD memory card, and the like). The storage device 170 may include a flash memory having a large storage capacity. Alternatively, the storage device 170 may include a next-generation non-volatile memory such as PRAM, MRAM, ReRAM, and FRAM. In some embodiments, the storage device 170 may be an internal memory provided in the SoC.

The NPU 140, the DSP 150, and the accelerator 190 may support the main processor 110 or, in some cases may replace functionality of the main processor 110, so that the NPU 140, the DSP 150, and the accelerator 190 may be provided as a separate IP for performing processing operations on security data or multimedia data. For example, the accelerator 190 may be provided as an IP for improving processing performance of text, audio, still images, animation, video, two-dimensional data, or three-dimensional data.

When IPs other than the main processor 110 or the DSP 150, which are main processors of the SoC, execute firmware in the TEE, the mobile device 100 according to an exemplary embodiment may omit unnecessary data exchange between the TEE area and the REE area in the memory 130 to efficiently and safely load the firmware (FW) image 174 into the memory 130 and verify the firmware (FW) image 174.

Figure 2:
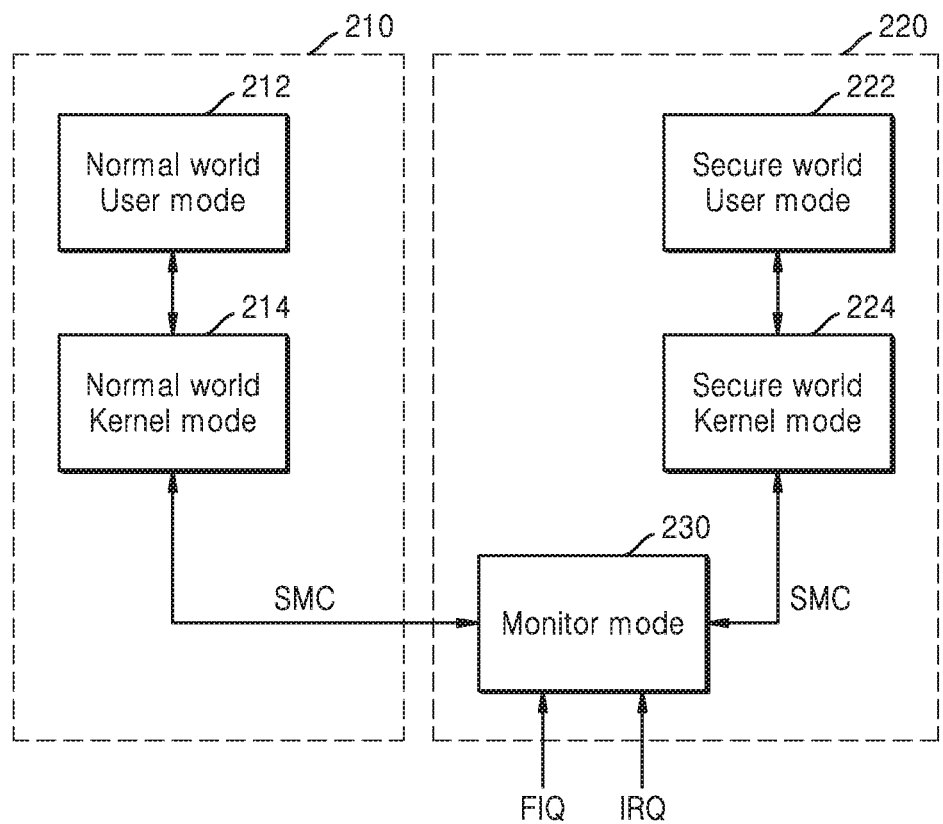
FIG. 2 is a block diagram illustrating a software architecture for a method operating in a normal world and a secure world according to an exemplary embodiment.

FIG. 2 is a block diagram illustrating a software architecture for a method operating in a normal world and a secure world according to an exemplary embodiment. According to some exemplary embodiments, the software architecture may be a Trustzone architecture.

Referring to FIG. 2, the Trustzone architecture may provide two runtime environments such as a normal world 210 and a secure world 220. The normal world 210 may include a normal world user mode 212 and a normal world kernel mode 214, and the secure world 220 may include a secure world user mode 222, a secure world kernel mode 224, and a monitor mode 230. Each of the normal and secure worlds 210 and 220 may be managed by virtually separating hardware resources such as a cache, a translation lookaside buffer (TLB), a memory management unit (MMU), and a register.

As described above, because the normal world 210 and the secure world 220 may be selectively operated, the Trustzone architecture may provide the monitor mode 230 to manage changes from the normal world 210 to the secure world 220, and vice versa. According to some exemplary embodiments, the software in the monitor mode 230 may operate in the secure world 220.

Moreover, because the normal world 210 and the secure world 220 are controlled by the monitor mode 230, various instructions or interrupts generated by the main processor 110 (see FIG. 1) may be provided to each of the normal and secure worlds 210 and 220 through the monitor mode 230. For example, the normal world kernel mode 214 or the secure world kernel mode 224 may be connected using a secure monitor call command (SMC). That is, the main processor 110 (see FIG. 1) may change the currently executed mode (e.g., the normal world kernel mode 214 or the secure world kernel mode 224) to the monitor mode 230 using the SMC. However, in addition to using the SMC, the main processor 110 (see FIG. 1) may change the currently executed mode to the monitor mode 230 using an Interrupt Request (IRQ) or a Fast Interrupt Request (FIQ). According to some exemplary embodiments, the IRQ may be used as an interrupt of the normal world 210, and the FIQ may be used as an interrupt of the secure world 220.

As described above, operating in the normal world 210 may correspond to operating in the REE, and operating in the secure world 220 may correspond to operating in the TEE.

The main processor 110 (see FIG. 1) according to an exemplary embodiment may be operated by switching from the normal world kernel mode 214 to the secure world kernel mode 224, and may be operated by switching from the secure world kernel mode 224 to the normal world kernel mode 214 so that the target firmware 134 (see FIG. 1) may be loaded into the memory 130 and verified to allow the execution in the future by the main processor 110 (see FIG. 1), or so that the target firmware 134 (see FIG. 1) may be loaded into the memory 130 and verified to allow the execution in the future by another IP (e.g., the NPU 140, the DSP 150, the security system 180, and/or the accelerator 190 (see FIG. 1)).

Figure 3:
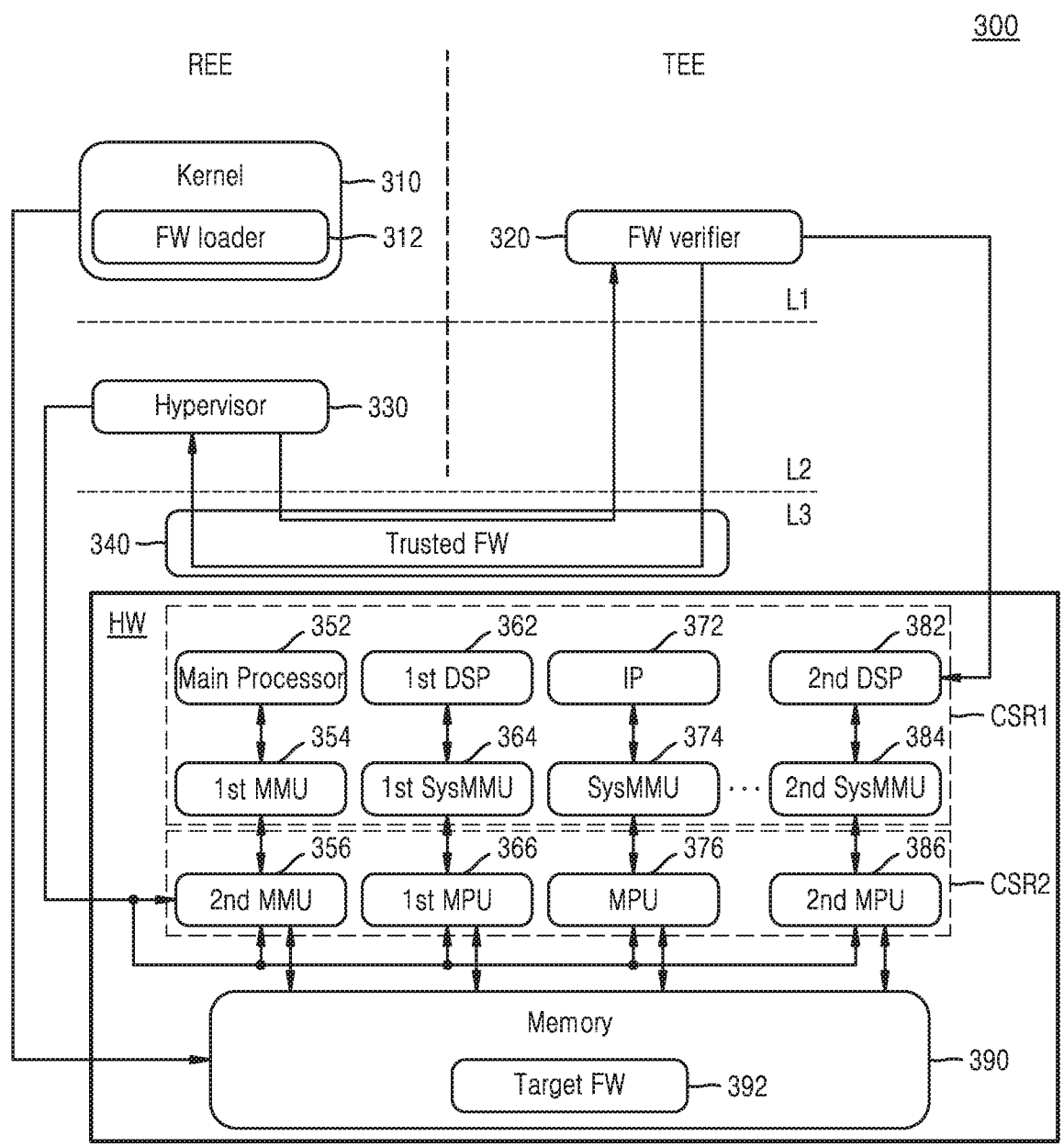
FIG. 3 is a block diagram illustrating an operation of a mobile device according to an exemplary embodiment.

FIG. 3 is a block diagram illustrating the operation of a mobile device according to an exemplary embodiment.

Referring to FIG. 3, a mobile device 300 may include, as hardware HW, a main processor 352, a first MMU ($1^{st}$ MMU) 354, a second MMU ($2^{nd}$ MMU) 356, a first DSP ($1^{st}$ DSP) 362, a first system MMU (SysMMU) 364, a first Memory Protection Unit ($1^{st}$ MPU) 366, a second DSP ($2^{nd}$ DSP) 382, a second system MMU ($2^{nd}$ SysMMU) 384, a second MPU 386, an IP 372, a system MMU (SysMMU) 374, an MPU 376, and a memory 390. Furthermore, exemplary embodiments are not limited to the example illustrated in FIG. 3, and the hardware HW may further include memory management units respectively connected to more and various IPs.

The main processor 352 may be directly connected to the first MMU 354, and may be connected to the second MMU 356 through the first MMU 354, and the main processor 352 may access the memory 390 by using the first MMU 354 and the second MMU 356 in stages. That is, the first MMU 354 may be of a first stage, and the second MMU 356 may be of a second stage. The first DSP 362 may be directly connected to the first system MMU 364, and may be connected to the first MPU 366 through the first system MMU 364, and the first DSP 362 may access the memory 390 by using the first system MMU 364 and the first MPU 366 in stages. The second DSP 382 may be directly connected to the second system MMU 384, and may be connected to the second MPU 386 through the second system MMU 384, and the second DSP 382 may access the memory 390 by using the second system MMU 384 and the second MPU 386 in stages. The IP 372 may be connected through the system MMU 374 and the MPU 376, and the IP 372 may access the memory 390 by using the system MMU 374 and the second MPU 386 in stages.

The first MMU 354 manages a Logical To Logical (L2L) mapping table in which the main processor 352 converts a first logical address to a second logical address for access to the memory 390, and the second MMU 356 may manage a physical to physical (P2P) mapping table that converts the second logical address to a physical address. The physical address may correspond to the actual address of the memory 390.

The MPUs, that is, the first MPU 366, the MPU 376, and the second MPU 386, may protect some areas of the memory 390 from non-secure access of the IPs, that is, the first DSP 362, the IP 372, and the second DSP 382. Specifically, the MPUs, that is, the first MPU 366, the MPU 376, and the second MPU 386, may divide an area of the memory 390 into a plurality of window areas, and protect the plurality of window areas from non-secure access of the IPs, that is, the first DSP 362, the IP 372, and the second DSP 382. The MPUs, that is, the first MPU 366, the MPU 376, and the first MPU 386, may manage a page table including address information of the memory 390 and attribute information corresponding to each address information.

Moreover, it may be understood that a kernel 310, a firmware (FW) verifier 320, and a hypervisor 330 may be programs executed by the main processor 352, and the following operations of the kernel 310, the firmware verifier 320, and the hypervisor 330 may be performed by the main processor 352.

In an exemplary embodiment, the kernel 310 and the firmware verifier 320 may operate on the first layer L1, the hypervisor 330 may operate on the second layer L2, and trusted firmware (FW) 340 may operate on the third layer L3. The trusted firmware 340 corresponds to firmware of known security (i.e., the security of the trusted firmware 340 has been confirmed in advance) such that the trusted firmware 340 may be securely used for transmission and reception of signals between the hypervisor 330 in the REE and the firmware verifier 320 in the TEE. Moreover, in some exemplary embodiments, the firmware verifier 320 in the TEE may operate on the second and third layers L2 and L3, and may be implemented to be included in the trusted firmware 340.

In an exemplary embodiment, the kernel 310 may control components included in a first control area CSR1, and the hypervisor 330 may control components included in a second control area CSR2. The kernel 310 cannot access the components included in the second control area CSR2, and thus cannot control the components included in the second control area CSR2. The first control area CSR1 may include the main processor 352, the first MMU 354, the first DSP 362, the first system MMU 364, the second DSP 382, the second system MMU 384, the IP 372, and the system MMU 374. The second control area CSR2 may include the second MMU 356, the first MPU 366, the second MPU 386, and the MPU 376.

The firmware (FW) loader 312 of the kernel 310 may copy (or load) the target firmware (FW) 392 to some area of the memory 390. For example, the target firmware 392 may be firmware of the first DSP 362. After loading, in order to prevent hacking of the target firmware 392 before performing verification on the target firmware 392, the hypervisor 330 may block access of the main processor 352, the first DSP 362, the IP 372, and the second DSP 382 to the memory 390 by controlling the second control area CSR2. For example, the hypervisor 330 may block access of the main processor 352 to the target firmware 392 by changing address information of the target firmware 392 in the L2P mapping table of the second MMU 356. Hereinafter, changing the address information may include changing an access attribute of a predetermined memory area corresponding to the address or deleting the address information. In addition, the hypervisor 330 may block access of the first DSP 362 to the target firmware 392 by changing the attribute information of the address corresponding to the target firmware 392 in the page table of the first MPU 366. Such a method may also be applied to the IP 372 and the second DSP 382.

The hypervisor 330 may request the firmware verifier 320 to verify the target firmware 392 through the trusted firmware 340, and the firmware verifier 320 may control the second DSP 382 to perform verification of the target firmware 392 in response to the request. The second DSP 382 may be set in advance to verify the target firmware 392 and may correspond to the security system 180 of FIG. 1. The hypervisor 330 may change the page table of the second MPU 386 so that the second DSP 382 may access the target firmware 392.

The second DSP 382 may perform integrity verification of the target firmware 392, and when integrity verification is complete, the firmware verifier 320 may provide the integrity verification results to the hypervisor 330 through the trusted firmware 340.

When the integrity verification result for the target firmware 392 passes, the hypervisor 330 may change the page table of the first MPU 366 so that the first DSP 362 may access the target firmware 392 in a TEE and execute the target firmware 392. In other words, the hypervisor 330 may block access by all components of the first control area CSR1 during verification, and then after verification may selectively allow access to the component of the first control area CSR1 that corresponds to the firmware that has been verified.

As such, in the mobile device 300 according to an exemplary embodiment, in order to provide an environment for the first DSP 362 to execute the target firmware 392 instead of the main processor 352 in the TEE, the hypervisor 330 effectively controls only the configuration of the second control area CSR2 to effectively block non-secure access and minimize data movement in the memory 390.

However, the configuration shown in FIG. 3 is only an example, and exemplary embodiments are not limited thereto. Moreover, the description above has been provide of the second DSP 382 preparing an environment for executing the target firmware 392 in the TEE. However, the technical principles of the present disclosure may be applicable to all cases where at least one IP other than the main processor 352 prepares an environment for executing the target firmware 392 in the TEE.

Figure 4A:
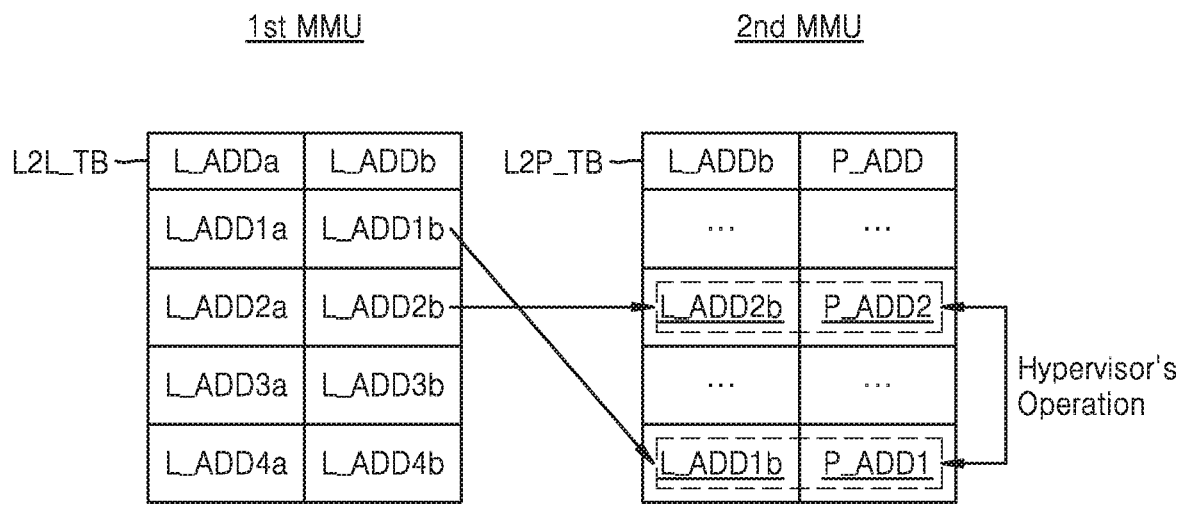
FIGS. 4A and 4B are diagrams for explaining the operation of a hypervisor for controlling access of a main processor of the mobile device of FIG. 3 to target firmware, according to an exemplary embodiment.
Figure 4B:
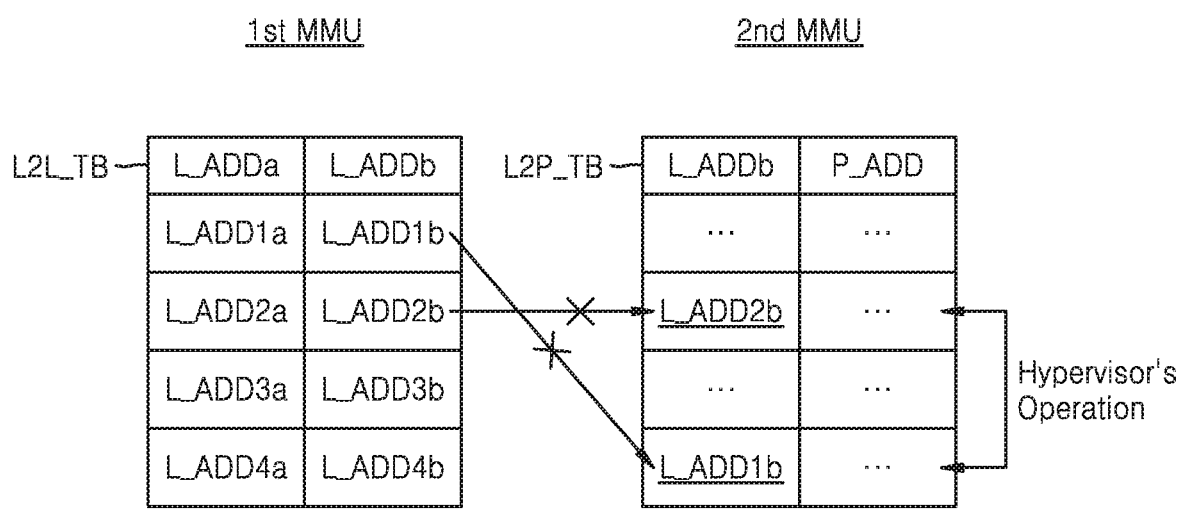

FIGS. 4A and 4B are diagrams for explaining the operation of the hypervisor 330 for controlling access of the main processor 352 to the target firmware 392 of FIG. 3.

Referring to FIGS. 3 and 4A, the first MMU 354 may manage the L2L mapping table L2L_TB. The L2L mapping table L2L_TB may include information on the first logical address L_ADDa and the second logical address L_ADDb mapped thereto. For example, if the main processor 352 provides the address 'L_ADD1$a$' to the first MMU 354 with a request for a predetermined operation, the first MMU 354 may convert 'L_ADD1$a$' to 'L_ADD1$b$' based on the L2L mapping table L2L_TB, and provide the conversion result address to the second MMU 356.

The second MMU 356 may manage the L2P mapping table L2P_TB. The L2P mapping table L2P_TB may include information on the second logical address L_ADDb and the physical address P_ADD mapped thereto. The physical address P_ADD may correspond to an actual address of the memory 390. For example, the second MMU 356 may convert the received 'L_ADD1$b$' into 'P_ADD1' based on the L2P mapping table L2P_TB, and access the corresponding address of the memory 390 using 'P_ADD1'.

Hereinafter, it is assumed that the physical addresses of the memory 390 in which the target firmware 392 is stored are 'P_ADD1' and 'P_ADD2'. In order to prevent non-secure access of the main processor 352 to the target firmware 392, the hypervisor 330 may perform an operation of changing, in the L2P mapping table L2P_TB, a physical address P_ADD corresponding to the target firmware 392 or a second logical address L_ADDb mapped thereto.

Referring to FIG. 4B further, the hypervisor 330 may delete 'P_ADD1' and 'P_ADD2', which are physical addresses P_ADD pointing to the target firmware 392, from the L2P mapping table L2P_TB. In some embodiments, the hypervisor 330 may delete 'L_ADD1$b$' and 'L_ADD2$b$' mapped to 'P_ADD1' and 'P_ADD2', which are physical addresses P_ADD pointing to the target firmware 392, from the L2P mapping table L2P_TB. Also, further, the hypervisor 330 may delete 'P_ADD1' and 'P_ADD2', which are physical addresses P_ADD pointing to the target firmware 392, and 'L_ADD1$b$' and 'L_ADD2$b$', which are respectively mapped to 'P_ADD1' and 'P_ADD2', from the L2P mapping table L2P_TB.

Moreover, the hypervisor 330 may back up the address information deleted (e.g., P_ADD1 and/or L_ADD1$b$) from the L2P mapping table L2P_TB to an arbitrary area of the memory 390 to block the non-secure access of the main processor 352, and in the future, the backed up address information may be restored from the arbitrary area of the memory 390 to the L2P mapping table L2P_TB to allow the main processor 352 to access the address information.

In some embodiments, the second MMU 356 may further manage information indicating read permission or write permission of an area of the memory 390 corresponding to the physical address P_ADD of the L2P mapping table L2P_TB, and the hypervisor 330 may control access of the main processor 352 to the memory 390 by changing the information indicating the read permission or the write permission.

Figure 5A:
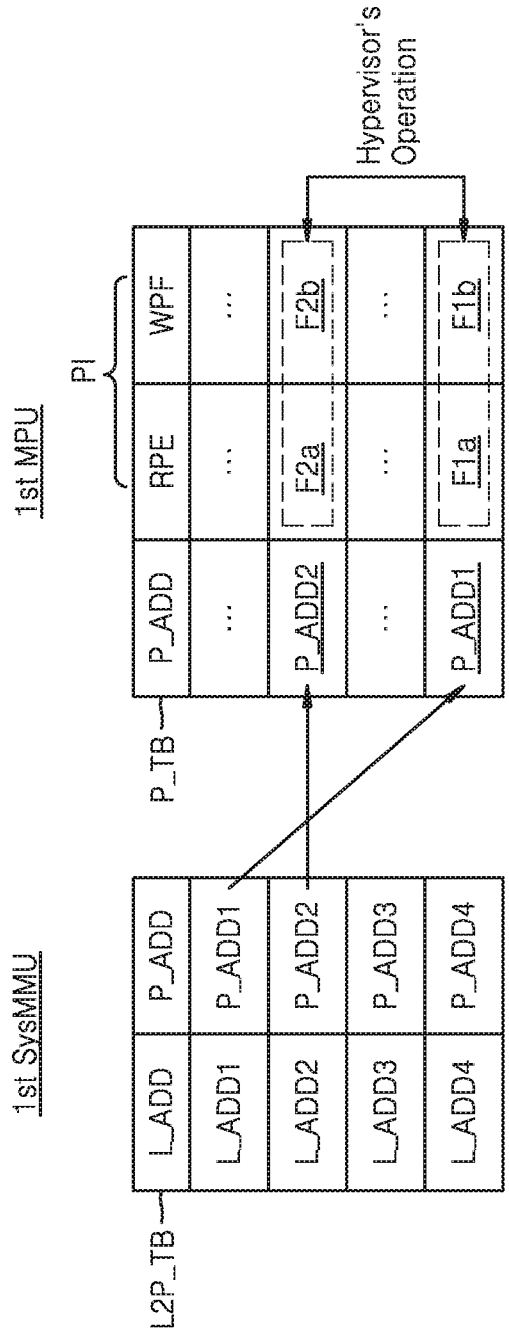
FIGS. 5A and 5B are diagrams for explaining the operation of a hypervisor for controlling access of a first DSP to target firmware of a main processor of the mobile device of FIG. 3, according to an exemplary embodiment.
Figure 5B:
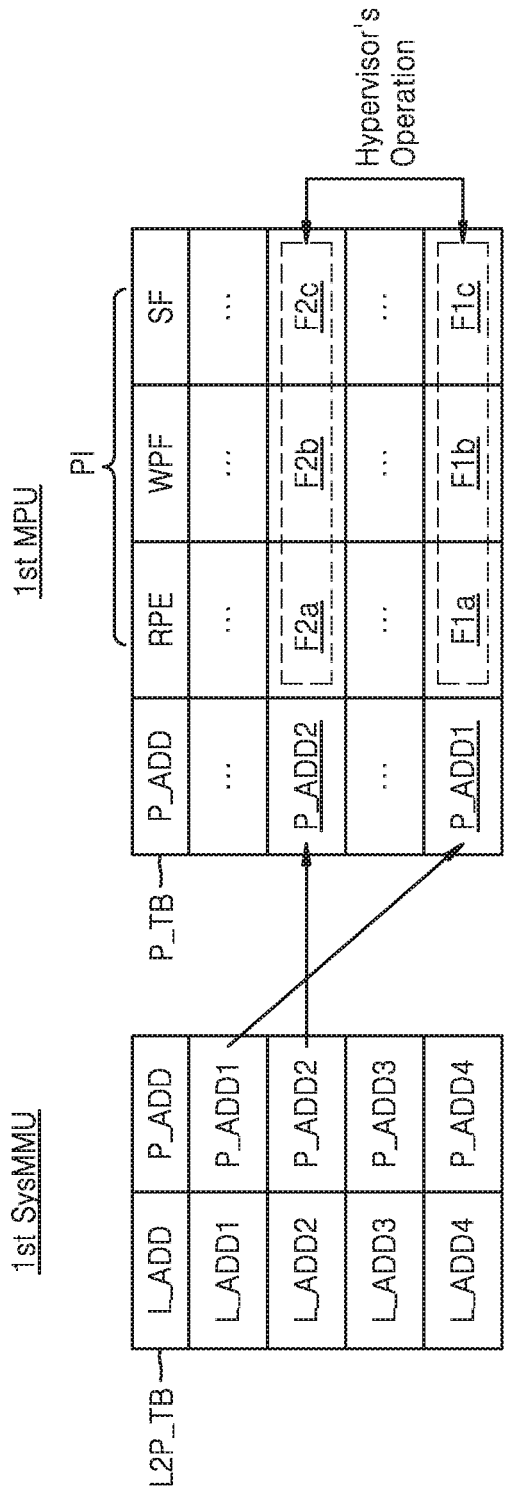

FIGS. 5A and 5B are diagrams for explaining the operation of the hypervisor 330 for controlling access of the first DSP 362 to the target firmware 392 of the main processor 352 of FIG. 3. Hereinafter, it is clear that the described technical principle is also applicable to controlling access of the IP 372 and the second DSP 382 to the target firmware 392 of the main processor 352.

Referring to FIGS. 3 and 5A, the first system MMU 364 may manage the L2P mapping table L2P_TB. The L2P mapping table L2P_TB may include information on the logical address L_ADD and the physical address P_ADD mapped thereto. For example, when the first DSP 362 provides the address 'L_ADD1' to the first system MMU 364 with a request for a predetermined operation, the first system MMU 364 may convert 'L_ADD1' to 'P_ADD1' based on the L2P mapping table L2P_TB, and provide the conversion result address to the first MPU 366.

The first MPU 366 may manage the page table P_TB. The page table P_TB may include a physical address P_ADD of the memory 390 and property information PI on the address. In an exemplary embodiment, property information PI may include a read permission flag RPF and a write permission flag WF. For example, the read permission flag RPF may be information indicating whether data stored in the corresponding physical address P_ADD may be read, and the write permission flag WPF may be information indicating whether data may be written in the corresponding physical address P_ADD.

In order to prevent non-secure access to the target firmware 392 by the first DSP 362, the hypervisor 330 may change property information PI corresponding to the physical address P_ADD of the memory 390 in which the target firmware 392 is stored. For example, as described above in FIG. 4A, the physical addresses of the memory 390 in which the target firmware 392 is stored may be 'P_ADD1' and 'L_ADD2', and thus the hypervisor 330 may change at least one of 'F1a', 'F1b', 'F2a', and 'F2b' corresponding to 'P_ADD1' and 'P_ADD2' to control the access of the target firmware 392 by the first DSP 362.

Referring to FIG. 5B, the page table P_TB may further include a secure flag SF corresponding to the physical address P_ADD of the memory 390 compared to FIG. 5A. The secure flag SF may be information indicating whether non-secure access or secure access to the corresponding physical address P_ADD is possible. The hypervisor 330 may control non-secure access and secure access by the first DSP 362 by changing the secure flag SF. For example, the hypervisor 330 may change at least one of 'F1a', 'F1b', 'F1c' corresponding to 'P_ADD1', and at least one of 'F2a', 'F2b', and 'F2c' corresponding to 'P_ADD2' to control the access of the target firmware 392 by the first DSP 362.

Figure 6:
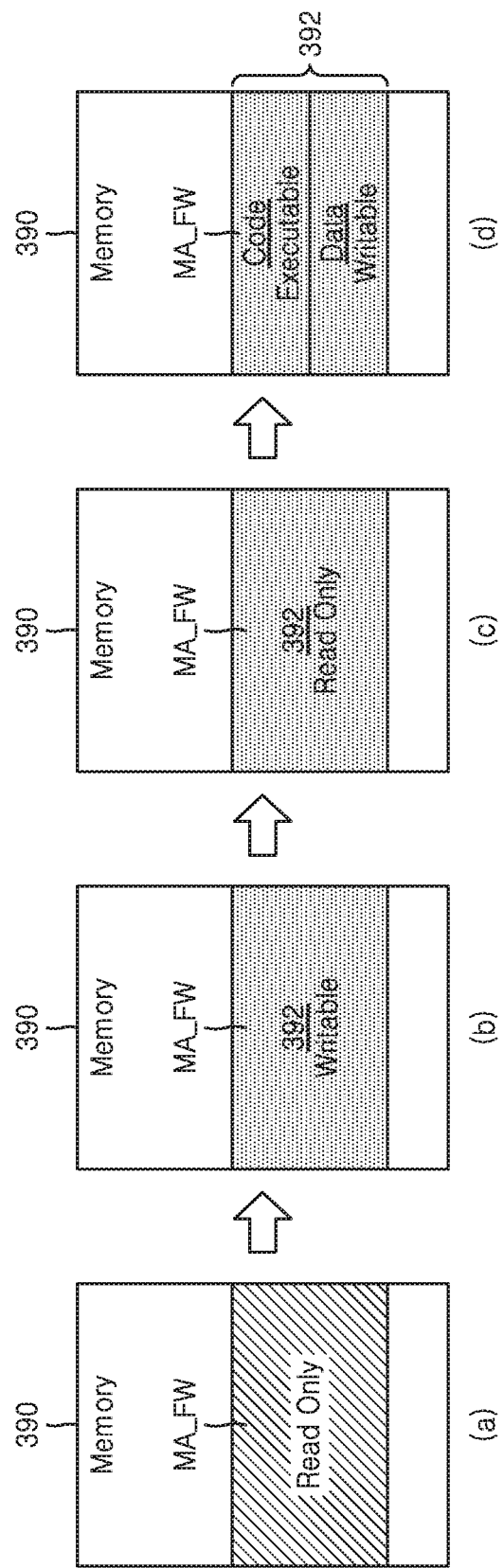
FIG. 6 is a diagram for explaining the operation of a hypervisor until target firmware of FIG. 3 is loaded into the memory and verified, according to an exemplary embodiment.

FIG. 6 is a diagram for explaining the operation of the hypervisor 330 until the target firmware 392 of FIG. 3 is loaded into the memory 390 and verified.

Referring to FIGS. 3 and 6, in (a) of FIG. 6, the memory area MA_FW in which the target firmware 392 of the memory 390 is stored may be set with "Read Only" permission such that the target firmware 392 may be only read by the main processor 352, the first DSP 362, the IP 372, and the second DSP 382. In (b) of FIG. 6, the hypervisor 330 may give the main processor 352 permission to write to the memory area MA_FW to allow the firmware loader 312 to load the target firmware 392 into the memory area MA_FW. Then, in (c) of FIG. 6, before the verification operation for the target firmware 392 is performed, the hypervisor 330 may change the main processor 352 to have "Read Only" permission for the memory area MA_FW. Although not shown in the drawing, the hypervisor 330 may further give the second DSP 382 write permission for the memory area MA_FW so that the second DSP 382 may perform a verification operation on the target firmware 392. When verification of the target firmware 392 is completed, in (d) of FIG. 6, the hypervisor 330 may further give the first DSP 362 "Code Executable" permission for the area where the code of the target firmware 392 is stored and "Data Writable" permission for the area where the data of the target firmware 392 is stored. Through this procedure, the first DSP 362 may execute the target firmware 392 and write data of the target firmware 392 to the memory 390.

However, the description provided with respect to content illustrated in FIG. 6 is only an exemplary embodiment, and exemplary embodiments are not limited thereto. In order to prevent hacking of the target firmware 392, the hypervisor 330 dynamically controls the second control area CSR2 such that various embodiments may be applied to block or grant access of the main processor 352, the first DSP 362, the IP 372, and the second DSP 382 to the target firmware 392.

Figure 7:
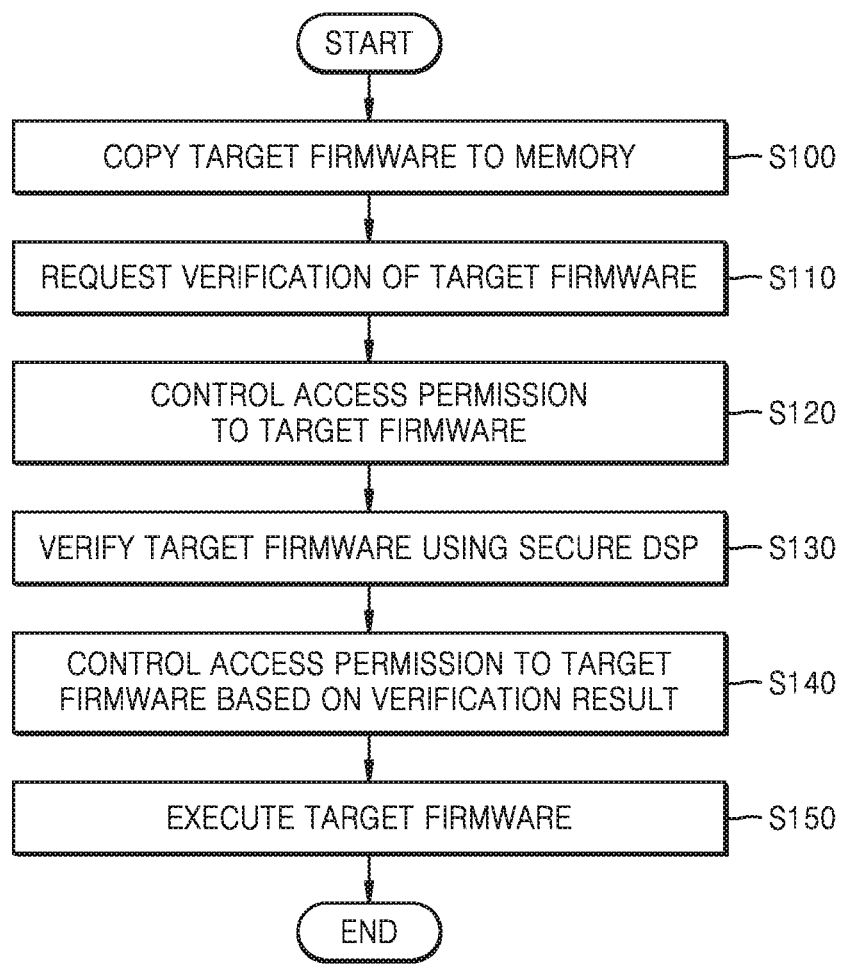
FIG. 7 is a flowchart showing a method of operating a system on chip, according to an exemplary embodiment.

FIG. 7 is a flowchart showing a method of operating an SoC, according to an exemplary embodiment.

Referring to FIG. 7, in operation S100, the SoC may copy the target firmware to the memory. For example, the SoC may copy (or load) the target firmware to the memory through the firmware uploader of the kernel. The target firmware is for handling security-related operations that must be protected from hacking and may be executed on a main processor, or a DSP (or IP) other than the main processor. In operation S110, the SoC may request verification of the target firmware. For example, the SoC may request the firmware verifier to verify the target firmware through the hypervisor. In operation S120, the SoC may control access permission to the target firmware. For example, in order to prevent hacking of the target firmware, before starting verification of the target firmware, the SoC may restrict the access permission of components (e.g., a main processor, another DSP, and the like) other than the secure DSP (or secure IP) to the target firmware, which is the subject of verification, through the hypervisor. In operation S130, the SoC may verify the target firmware using a secure DSP. For example, the SoC may verify the target firmware using a security DSP through a firmware verifier. In some embodiments, the SoC may verify the target firmware using the main processor in the TEE instead of the security DSP, and in some embodiments, when the main processor is running TEE-related code, the SoC may verify the target firmware using a hypervisor. In operation S140, the SoC may control access permission to the target firmware based on the verification result. For example, based on the verification result, the SoC may grant access permission to the target firmware by the subject executing the target firmware through the hypervisor. For example, when the subject executing the target firmware is a DSP, the SoC may grant access to the DSP to allow the DSP to execute the target firmware through the hypervisor. In operation S150, the SoC may execute the target firmware. For example, the SoC may execute the target firmware through the DSP.

Figure 8:
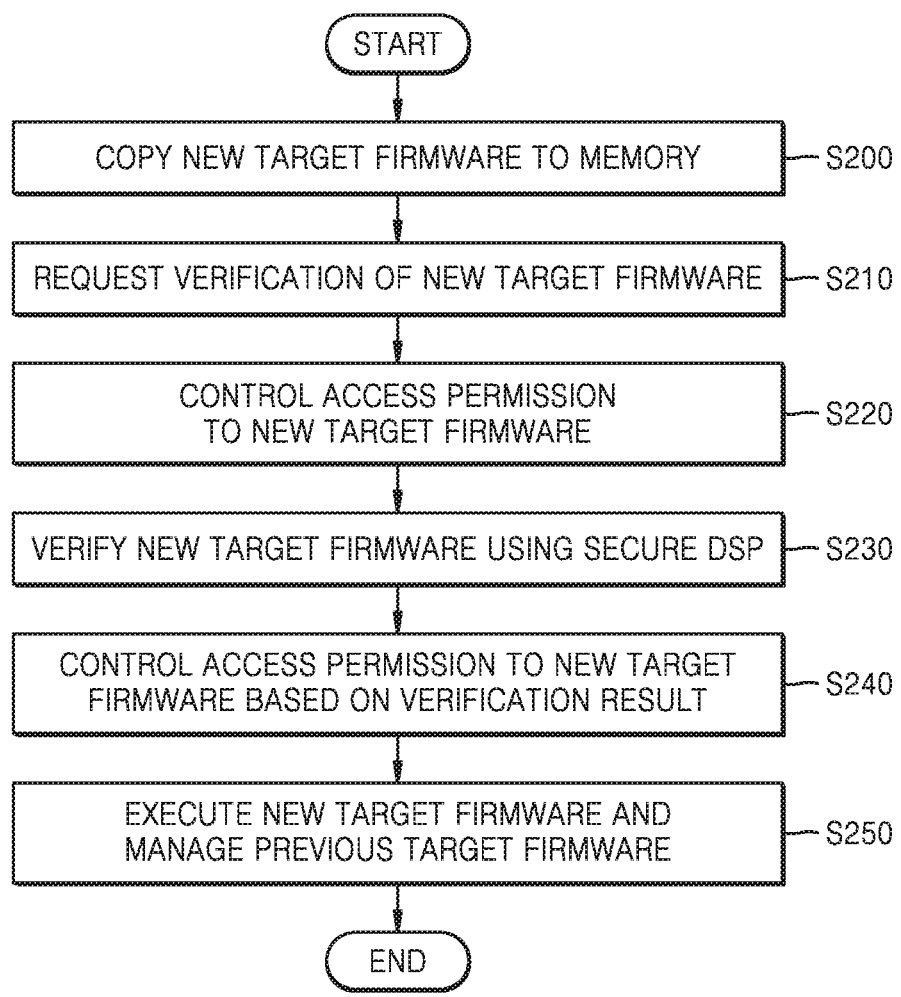
FIGS. 8 to 10 are flowcharts showing a method of operating a system on chip, according to an exemplary embodiment.

FIG. 8 is a flowchart showing a method of operating an SoC, according to an exemplary embodiment.

Referring to FIG. 8, when execution of new target firmware is required, in operation S200 the SoC may copy (or load) the new target firmware to a memory. For example, when execution of new target firmware is required, the SoC may copy (or load) the new target firmware into a memory through the firmware uploader of the kernel. The new target firmware may be copied to a different area of the memory than the target firmware described in FIG. 7. The new target firmware is for handling security-related operations that must be protected from hacking and may be executed on a main processor, or a DSP (or IP) other than the main processor. In operation S210, the SoC may request verification of the new target firmware. For example, the SoC may request the firmware verifier to verify the new target firmware through the hypervisor. In operation S220, the SoC may control access permission to the new target firmware. For example, in order to prevent hacking of the new target firmware, before starting verification of the new target firmware, the SoC may restrict the access permission of components (e.g., a main processor, another DSP, and the like) other than the secure DSP (or secure IP) to the target firmware, which is the subject of verification, through the hypervisor. In operation S230, the SoC may verify the new target firmware using a secure DSP. For example, the SoC may verify the new target firmware using a security DSP through a firmware verifier. In operation S240, the SoC may control access permission to the new target firmware based on the verification result. For example, based on the verification result, the SoC may grant access permission to the target firmware by the subject executing the new target firmware through the hypervisor. In various embodiments, the subject executing the target firmware of FIG. 7 and the subject executing the new target firmware may be identical to or different from each other. In operation S250, the SoC may execute the new target firmware and manage previous target firmware. For example, the SoC may execute the new target firmware via the DSP, and may manage access of the main processor to the target firmware through the hypervisor to allow the firmware uploader to access the previously targeted firmware whenever necessary.

Figure 9:
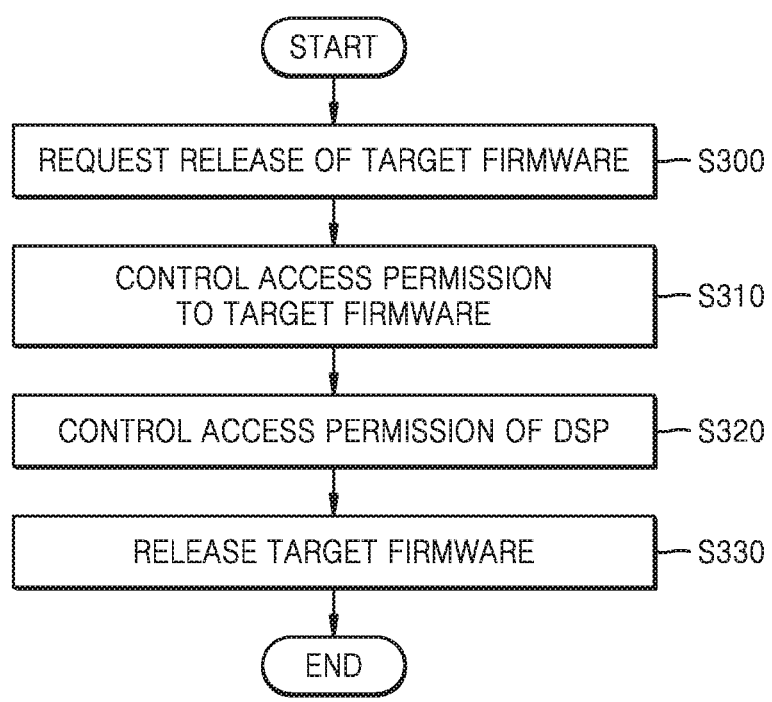

FIG. 9 is a flowchart showing a method of operating an SoC, according to an exemplary embodiment.

Referring to FIG. 9, in operation S300, when the operation of the target firmware is completed and the target firmware no longer is to be executed, the SoC may request release of the target firmware. For example, the SoC's DSP may request the hypervisor to release the target firmware. In operation S310, the SoC may control access permission to the target firmware. For example, the SoC may grant the main processor access permission to the target firmware through the hypervisor. In operation S320, the SoC may control access permission of the DSP. For example, the SoC may change the page table of the MPU corresponding to the DSP through a hypervisor to block access permission of the DSP to the target firmware. In operation S330, the SoC may release the target firmware. For example, the SoC may release the target firmware from the DSP.

Figure 10:
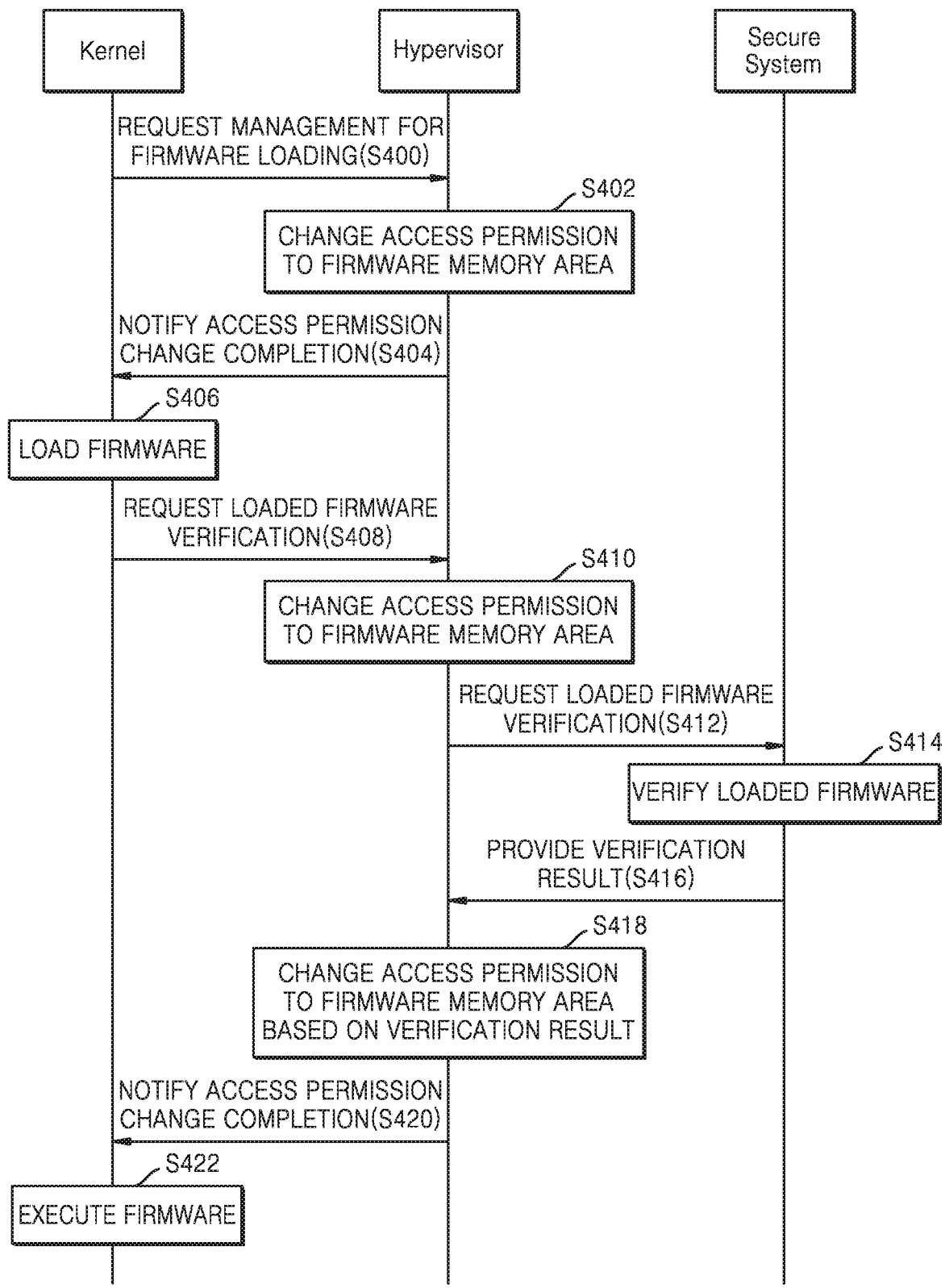

FIG. 10 is a flowchart of a method of operating an SoC, according to an exemplary embodiment. Hereinafter, the SoC includes a main processor, a plurality of IPs, and a security system, and the kernel and hypervisor may be driven by the main processor.

Referring to FIG. 10, in operation S400, the kernel may request the hypervisor for management for firmware loading. In operation S402, the hypervisor may change the access permission to the firmware memory area of the memory so that the kernel may load into the memory the firmware stored in the predetermined storage device. Specifically, the hypervisor may change the L2P mapping table or predetermined information of the second MMU 356 of FIG. 3 to allow the kernel to access the firmware memory area and copy the firmware to the firmware memory area. In operation S404, the hypervisor may inform the kernel that the access permission change to the firmware memory area is completed. In operation S406, the kernel may load the firmware into the memory. In operation S408, the kernel may request the hypervisor to verify the loaded firmware. In operation S410, the hypervisor may change the access permission to the firmware memory area before starting the firmware verification. Specifically, the hypervisor may grant permission to access the firmware memory area to the security system that performs firmware verification, and block access to the firmware memory area by the main processor and the plurality of IPs. In operation S412, the hypervisor may request firmware verification by the security system. In operation S414, the security system may perform verification on the loaded firmware in response to the request of the hypervisor. For example, the security system may perform a signature verification operation on the loaded firmware based on various methods and algorithms. In operation S416, the security system may provide the verification result of the firmware to the hypervisor. In operation S418, the hypervisor may change the access permission to the firmware memory area based on the verification result. Specifically, the hypervisor may grant permission to access the firmware memory area to a plurality of IPs or to a main processor selected to execute firmware. For example, when the main processor is selected to execute the firmware, access permission to the firmware memory area may be blocked for a plurality of IPs and a security system. In operation S404, the hypervisor may inform the kernel that the access permission change to the firmware memory area is completed. In operation S422, the kernel may access the firmware memory area and execute the firmware.

Figure 11:
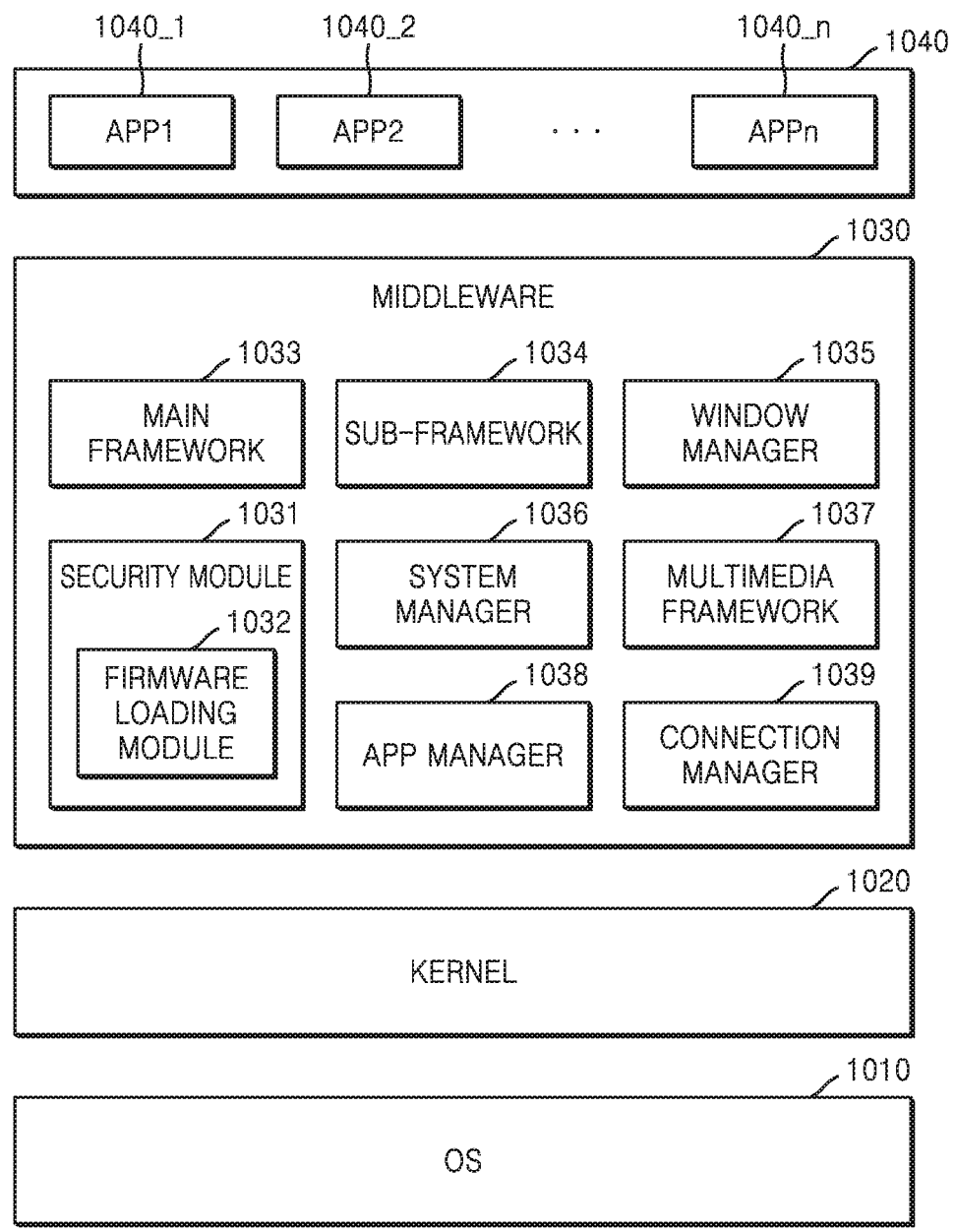
FIG. 11 is a block diagram illustrating a software architecture structure stored in a memory or storage device of FIG. 1 according to an exemplary embodiment.

FIG. 11 is a block diagram illustrating a software architecture structure stored in the memory 130 and/or the storage device 170 of FIG. 1 according to an exemplary embodiment.

Referring to FIG. 11, the memory 130 (see FIG. 1) or the storage device 170 (see FIG. 1) may include an operating system (OS) 1010, a kernel 1020, middleware 1030, and applications 1040.

The operating system 1010 controls and manages the overall operation of the hardware. The operating system 1010 is a layer responsible for basic functions such as hardware management, memory, and security.

The kernel 1020 may serve as a path for transmitting various signals including a touch signal inputted through an input device to the middleware 1030.

The middleware 1030 may include various software modules that control the operation of the mobile device or electronic device. The middleware 1030 may include a security module 1031, a main framework 1033, a sub-framework 1034, a window manager 1035, a system manager 1036, a multimedia framework 1037, an APP manager 1038, and a connection manager 1039.

The security module 1031 is a module that supports hardware certification, secure storage, and the like, and may include a firmware loading module 1032 according to various example embodiments of the present disclosure. The firmware loading module 1032 may correspond to the secure memory management software 130 of FIG. 1. A hypervisor according to example embodiments of the present disclosure may operate based on the firmware loading module 1032. That is, in a series of operations of loading the firmware into a predetermined memory through the firmware loader of the kernel 1020, performing verification for the firmware, and executing the firmware, the hypervisor may quickly and easily change the access permission to the firmware of the IP that is the subject of each operation. For example, when controlling access to the main processor's firmware, it is possible to change the information of the MMU connected to the main processor, and when controlling the access permission of the predetermined IP firmware, it is possible to change the information of the MPU connected to the IP.

The main framework 1033 is a module for providing various user interfaces to be displayed on a main area of the display. The sub-framework 1034 is a module for providing various user interfaces to be displayed in a sub-area of the display.

The window manager 1035 may detect a touch event or another input event using the user's body or pen. When such an event is detected, the window manager 1035 transmits an event signal to the main framework 1033 or the sub-framework 1034 to perform an operation corresponding to the event.

The system manager 1036 monitors the state of each component in the mobile device or the electronic device, and provides the monitoring result to other modules. For example, if the battery level is low, an error occurs, the communication connection status is lost, and the like, the system manager 1036 may provide the monitoring result to the main framework 1033 or the sub-framework 1034 to output a notification message or a notification sound.

The multimedia framework 1037 is a module for playing multimedia content stored in a mobile device or an electronic device or provided from an external source. The APP manager 1038 is a module that manages execution states of various applications 1040 installed in the memory. The connection manager 1039 is a module for supporting wired or wireless network connection.

However, the structure illustrated in FIG. 11 is only an example and exemplary embodiments are not limited thereto. Accordingly, it is clear that some components may be omitted, modified, or added depending on the type or purpose of the mobile device or electronic device.

Figure 12:
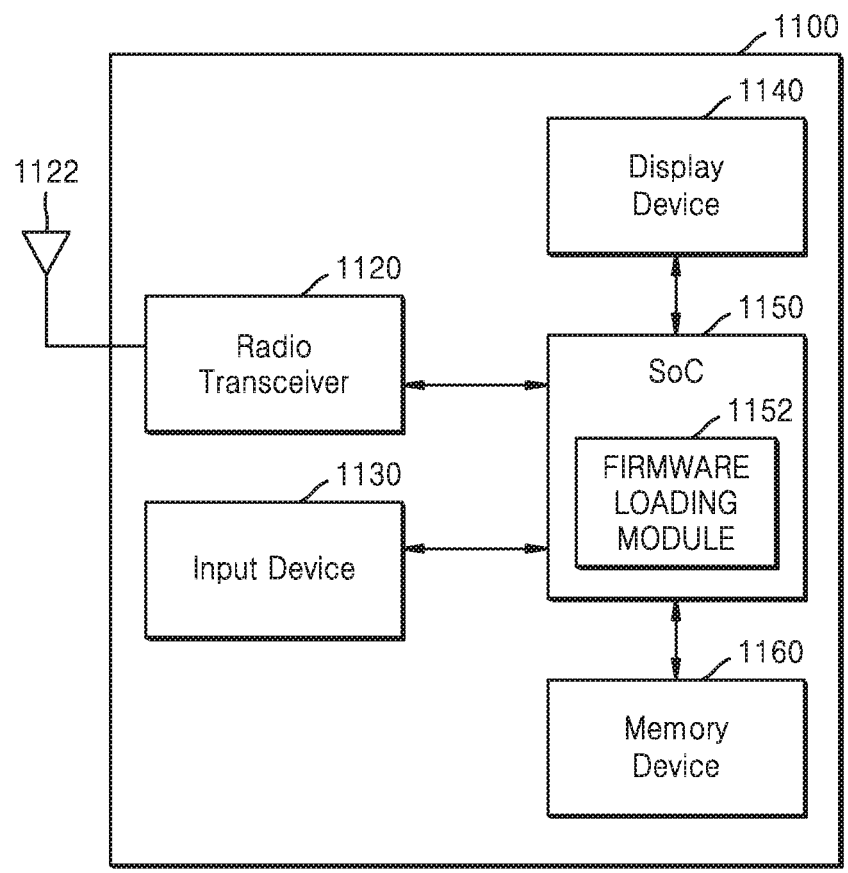
FIG. 12 is a block diagram illustrating an electronic device including a system on chip according to an exemplary embodiment.

FIG. 12 is a block diagram illustrating an electronic device 1100 including an SoC 1150 according to an exemplary embodiment. Hereinafter, the electronic device 1100 may be implemented as a wireless communication device such as a mobile phone, a smart phone, and a tablet PC.

Referring to FIG. 12, the electronic device 1100 may include a radio transceiver 1120, an input device 1130, a display device 1140, an SoC 1150, and a memory device 1160.

The radio transceiver 1120 may transmit and receive a wireless signal through an antenna 1122, and may change the wireless signal to a signal that may be processed by the SoC 1150.

The SoC 1150 processes a signal outputted from the wireless transceiver 1120 and may transmit the processed signal to the memory device 1160 or the display device 1140. In addition, the SoC 1150 may include a firmware loading module 1152 according to various exemplary embodiments and may operate based on the firmware loading module 1152, so that efficient and secure firmware loading to the memory device 1160, firmware verification, and firmware execution may be performed.

The input device 1130 is a device that may input a control signal for controlling the operation of the SoC 1150 or data to be processed by the SoC 1150, and may be implemented with a pointing device, such as a touch pad and a computer mouse, a keypad, or a keyboard.

The SoC 1150 may control the operation of the display device 1140 so that data outputted from the memory device 1160 may be displayed on the display device 1140.

Figure 13:
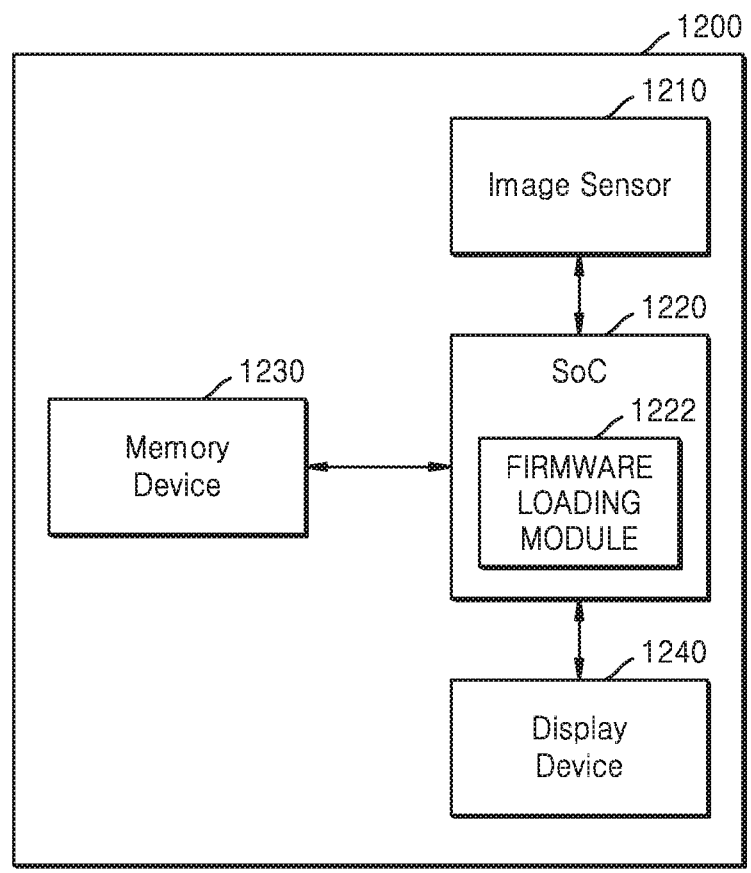
FIG. 13 is a block diagram illustrating an electronic device including a system on chip according to an exemplary embodiment.

FIG. 13 is a block diagram illustrating an electronic device 1200 including an SoC 1220 according to an exemplary embodiment. Hereinafter, the electronic device 1200 may be implemented as an image processing device, for example, a digital camera, a mobile phone with a digital camera, a smartphone with a digital camera, or a tablet PC with a digital camera.

Referring to FIG. 13, the electronic device 1200 may include an image sensor 1210, an SoC 1220, a memory device 1230, and a display device 1240.

The image sensor 1210 may convert the optical image to a digital image, and the conversion result may be transmitted to the SoC 1220 or the memory device 1230. The digital image resulting from conversion under the control of the SoC 1220 may be displayed on the display device 1240 or stored in the memory device 1230. Data stored in the memory device 1230 may be displayed on the display device 1240 under the control of the SoC 1220.

The SoC 1220 may include a firmware loading module 1152 according to various exemplary embodiments and may operate based on the firmware loading module 1222, so that efficient and secure firmware loading to the memory device 1230, firmware verification, and firmware execution may be performed.

Figure 14:
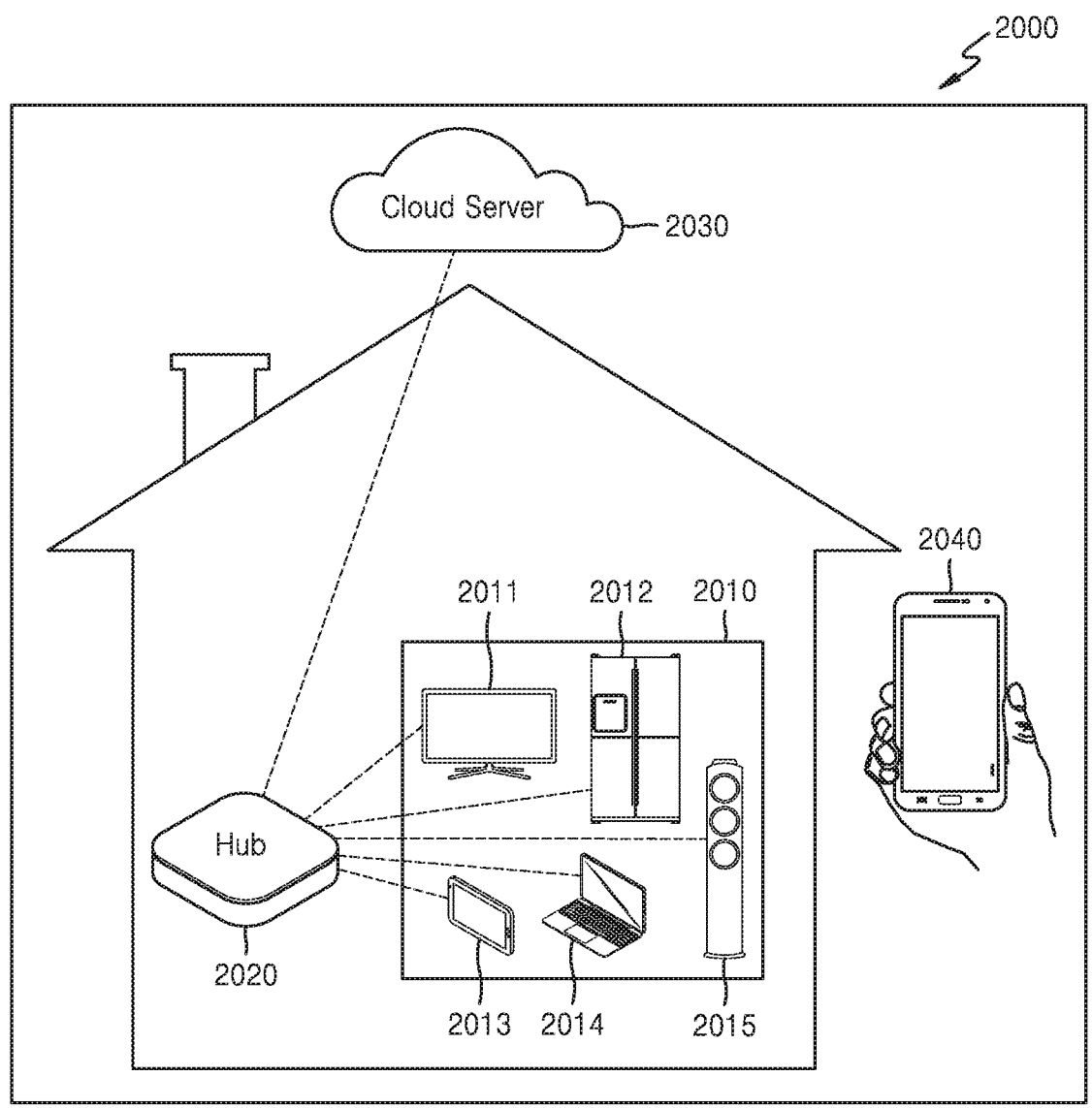
FIG. 14 is a diagram illustrating a smart home implemented by connecting a plurality of Internet of Things (IoT) devices to a server according to an exemplary embodiment.

FIG. 14 is a diagram illustrating a smart home 2000 implemented by connecting a plurality of Internet of Things (IoT) devices to a server according to an exemplary embodiment.

Referring to FIG. 14, the smart home 2000 may include a plurality of IoT devices 2010, a hub 2020, a server 2030, and an electronic device 2040.

The plurality of IoT devices 2010 may include a TV 2011, a refrigerator 2012, a tablet 2013, a laptop 2014, and/or an air conditioner 2015. However, this is an exemplary embodiment, and the plurality of IoT devices 2010 are not limited to those illustrated in FIG. 14.

The plurality of IoT devices 2010 may be connected to the server 2030 through the hub 2020. A plurality of device identification information on each of the plurality of IoT devices 2010 may be transmitted to the server 2030 by the electronic device 2040. Each of the plurality of IoT devices 2010 may be paired with and connected to the hub 2020 corresponding to hub identification information registered in the server 2030. The plurality of IoT devices 2010 may communicate with the server 2030 through a connection with the hub 2020.

The hub 2020 may relay a connection between the plurality of IoT devices 2010 and the server 2030. According to various embodiments, the hub 2020 may perform a function of a router, a bridge, or an access point (AP). The server 2030 may include a processor and a wireless communication circuit. The processor may control the overall operation of the server 2030. The server 2030 may communicate with the hub 2020 using the wireless communication circuit or may communicate with the plurality of IoT devices 2010 through the hub 2020.

The electronic device 2040 may include a processor and a wireless communication circuit. The processor may control the overall operation of the electronic device 2040. The electronic device 2040 may communicate with the server 2030 using the wireless communication circuit. According to various embodiments, the electronic device 2040 may further include a display, a camera, or an input/output module.

When starting communication with the plurality of IoT devices 2010, the electronic device 2040 may execute firmware related to security or authentication, and at this time, the electronic device 2040 may operate based on a firmware loading module according to various exemplary embodiments. For example, the electronic device 2040 may be the electronic device 1100 of FIG. 12, or the electronic device 1200 of FIG. 13.

While various exemplary embodiments have been particularly shown and described above, it will be understood that various changes in form and details may be made therein without departing from the spirit and scope of the following claims.

What is claimed is:

1. A method of operating a system on chip having a main processor and a plurality of first Intellectual Properties (IPs), the method comprising:
   copying, by the main processor using a firmware loader, first target firmware to a memory;
   blocking, by the main processor using a hypervisor, access to the first target firmware by the main processor and the plurality of first IPs, wherein blocking the access to the first target firmware by the main processor and the plurality of first IPs comprises changing, by the main processor using the hypervisor, information on the memory in a memory management unit (MMU)

connected to the main processor and in memory protection units (MPUs) respectively connected to the plurality of first IPs;
verifying, by the main processor using a firmware verifier, the first target firmware; and
granting, by the main processor using the hypervisor, access to the first target firmware by a target IP among the plurality of first IPs based on a verification result.

2. The method of claim 1, wherein the firmware loader and the hypervisor operate in a Rich Execution Environment (REE), and the firmware verifier operates in a Trusted Execution Environment (TEE).

3. The method of claim 1, wherein the plurality of first IPs comprise at least one of a digital signal processor (DSP), a neural processing unit (NPU), a tensor processing unit (TPU), or an image signal processor (ISP).

4. The method of claim 1, wherein the changing the information comprises changing, by the main processor using the hypervisor, a logical to physical (L2P) mapping table of the MMU to block access of the main processor to the first target firmware.

5. The method of claim 1, wherein the changing the information comprises changing, by the main processor using the hypervisor, a page table of the MPUs to block access of the plurality of first IPs to the first target firmware.

6. The method of claim 5, wherein the page table comprises address information of the memory to which the first target firmware is copied and property information corresponding to the address information.

7. The method of claim 1, wherein the system on chip further comprises a second IP for security,
wherein the verifying comprises controlling, by the main processor using the firmware verifier, the second IP to perform a signature verification operation of the first target firmware.

8. The method of claim 1, wherein the granting comprises, when the verification result is a pass, changing, by the main processor using the hypervisor, information on the memory in a memory protection unit (MPU) connected to the target IP.

9. The method of claim 1, further comprising:
when execution for the first target firmware of the target IP is completed, granting, by the main processor using the hypervisor, access to the first target firmware by the main processor to allow access to the first target firmware by the firmware loader; and
blocking, by the main processor using the hypervisor, access to the first target firmware by the target IP.

10. The method of claim 1, further comprising:
when execution of second target firmware is requested by one of the plurality of first IPs, copying, by the main processor using the firmware loader, the second target firmware to the memory;
blocking, by the main processor using the hypervisor, access to the second target firmware by the main processor and the plurality of first IPs;
verifying, by the main processor using the firmware verifier, the second target firmware;
granting, by the main processor using the hypervisor, access to the second target firmware by the one of the plurality of first IPs that requested the execution of the second target firmware, based on a verification result of the second target firmware; and
granting, by the main processor using the hypervisor, access to the first target firmware by the main processor to allow access to the first target firmware by the firmware loader.

11. A System on Chip (SoC) comprising:
a memory;
a main processor configured to run an operating system and connected to a first memory management unit (MMU) managing an L2L mapping table and a second MMU managing an L2P mapping table to access the memory in stages; and
a plurality of first Intellectual Properties (IPs) configured to perform a respective processing operation and connected to system MMUs managing an L2P mapping table and to memory protection units (MPUs) managing a page table to access the memory in the stages,
wherein the main processor is configured to:
copy target firmware to the memory using a firmware loader,
using a hypervisor, block access of the main processor and the plurality of first IPs to the target firmware before verification of the target firmware, and
using the hypervisor, grant access to the target firmware by a target IP among the plurality of first IPs that corresponds to the target firmware after the verification of the target firmware.

12. The SoC of claim 11, wherein the main processor grants access to the target firmware by changing, using the hypervisor, information on the memory in the second MMU and in the MPUs.

13. The SoC of claim 12, wherein the information on the memory comprises the L2P mapping table of the second MMU including physical address information of the memory to which the target firmware is copied and logical address information mapped thereto, and the page table of the MPUs including the physical address information and property information corresponding thereto.

14. The SoC of claim 11, wherein the main processor is configured to control the first MMU and the system MMUs using a kernel.

15. The SoC of claim 11, wherein the plurality of first IPs comprise at least one of a digital signal processor (DSP), a neural processing unit (NPU), a tensor processing unit (TPU), or an image signal processor (ISP).

16. The SoC of claim 11, further comprising a second IP for performing verification on the target firmware,
wherein the main processor controls, using a firmware verifier, the second IP to perform a signature verification operation of the target firmware.

17. The SoC of claim 16, further comprising a storage device in which the target firmware, the firmware loader, the hypervisor, and the firmware verifier are stored in a form of code executable by the main processor.

18. An operating method of a system on chip having a main processor, a plurality of Intellectual Properties (IPs), and a security system, the operating method comprising:
requesting, by a kernel executed by the main processor to a hypervisor executed by the main processor, management for loading target firmware;
changing, by the hypervisor, access permission for at least one of the main processor and the plurality of IPs to a memory area to which the target firmware is to be loaded by changing information on the memory area in a memory management unit (MMU) connected to the main processor and in memory protection units (MPUs) respectively connected to the plurality of IPs;
loading, by the kernel, the target firmware into the memory area;
requesting, by the kernel to the hypervisor, verification of the target firmware that is loaded;

changing, by the hypervisor, the access permission for at least one of the main processor and the plurality of IPs to the memory area;

requesting, by the hypervisor to the security system, verification of the target firmware that is loaded;

performing, by the security system, verification on the target firmware that is loaded;

providing, by the security system to the hypervisor, a verification result of the verification;

changing, by the hypervisor based on the verification result, the access permission for at least one of the main processor and the plurality of IPs to the memory area; and executing, by the kernel, the target firmware that is loaded.

\* \* \* \* \*